United States Patent
Chen

(10) Patent No.: US 7,928,588 B2
(45) Date of Patent: Apr. 19, 2011

(54) CIRCUIT SIGNAL CONNECTION INTERFACE, A MANUFACTURE METHOD THEREOF, AND AN ELECTRONIC DEVICE USING THE SAME

(75) Inventor: Chih-Chia Chen, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 169 days.

(21) Appl. No.: 12/128,842

(22) Filed: May 29, 2008

(65) Prior Publication Data

US 2008/0297713 A1 Dec. 4, 2008

(30) Foreign Application Priority Data

May 30, 2007 (TW) ............................ 96119394 A

(51) Int. Cl.
 H01L 23/48 (2006.01)
 H01L 23/52 (2006.01)
 H01L 29/40 (2006.01)
(52) U.S. Cl. ........................... 257/786; 257/691
(58) Field of Classification Search .................. 257/784, 257/758, 691, 786
See application file for complete search history.

(56) References Cited

U.S. PATENT DOCUMENTS

| | | | |
|---|---|---|---|
| 7,385,297 B1* | 6/2008 | Gumaste et al. | 257/784 |
| 7,649,260 B2* | 1/2010 | Shindo et al. | 257/758 |
| 2006/0160205 A1 | 7/2006 | Blackburn et al. | |
| 2006/0163723 A1 | 7/2006 | Hsu | |
| 2006/0264021 A1 | 11/2006 | Farahani et al. | |
| 2007/0080416 A1 | 4/2007 | Yoshioka et al. | |
| 2009/0085072 A1* | 4/2009 | Lee et al. | 257/253 |
| 2010/0065954 A1* | 3/2010 | Tu et al. | 257/686 |

FOREIGN PATENT DOCUMENTS

| | | |
|---|---|---|
| TW | 200421585 | 4/1992 |
| TW | M260879 | 8/1993 |
| TW | 200701489 | 6/1994 |

OTHER PUBLICATIONS

English language translation of abstract of TW 200701489.
English language translation of abstract of TW 200421585.
English language translation of abstract of TW M260879.

* cited by examiner

*Primary Examiner* — S. V Clark
(74) *Attorney, Agent, or Firm* — Thomas, Kayden, Horstemeyer & Risley, LLP

(57) ABSTRACT

A circuit signal connection interface, a manufacturing method thereof, and an electronic device using the same are provided. The circuit signal connection interface includes a first signal line and a second signal line juxtaposed to each other, an insulation layer, and a first conductive pad. The first conductive pad electrically connects to the first signal line, and crosses the second signal line. The insulation layer is disposed between the second signal line and the first conductive pad. The electronic device further includes a circuit device including a first conducting bump and a second conducting bump connected to each other in a parallel manner. The first conducting bump electrically connects to a first portion of the first conductive pad while the second conducting bump electrically connects to a second portion of the first conductive pad.

31 Claims, 17 Drawing Sheets

CIRCUIT SIGNAL CONNECTION INTERFACE, A MANUFACTURE METHOD THEREOF, AND AN ELECTRONIC DEVICE USING THE SAME

This application claims priority based on a Taiwanese patent application No. 096119394 filed on May 30, 2007.

BACKGROUND OF THE INVENTION

1. Field of the Invention

This invention relates generally to a circuit signal connection interface, a manufacturing method thereof, and an electrical device using the circuit signal connection interface.

2. Description of the Prior Art

The advance in display panel technology drives the demand for technology growth in the packaging of display panel driver integrated circuits (ICs). Take thin film transistor liquid crystal displays (TFT-LCDs) for instance; the conventional IC package method includes tape carrier package (TAP), chip on film (COF), and chip on glass (COG). The COG has the advantages of lower cost, simplicity in manufacturing process and high precision, and thus gradually becomes the popular choice of package method.

FIG. 1 is the schematic view of a conventional COG package. Display device 10 includes a display panel 11, a circuit signal output end 13, and a circuit signal input end 15. The circuit signal output end 13 and the circuit signal input end 15 both have a plurality of electrical conductive pads 17 and the signal lines 18 connected to the conductive pads 17. In order to reduce overall size of the system, the conductive pads 17 of circuit signal output end 13 are disposed in an interlaced manner to increase the number of conductive pads 17 and signal lines 18. A plurality of conductive convexes 31 are disposed on two ends of drive circuit 30. Each conductive convex 31 corresponds and couples to one conductive pad 17. After signals from circuit signal input end 15 going to drive circuit 30, the signals are calculated and then output from the circuit signal output end 13 to the display panel 11 to display images.

Signal transmission quality between conductive convexes 31 and the conductive pads 17 are decided by several factors and one of the factors is the area size of which the conductive pads 17 or conductive convexes 31 contact with the medium. However, as increasing needs for reducing system size and for improving image quality, people tend to make the contact area size smaller, which leads to problems on signal transmission.

SUMMARY OF THE INVENTION

It is an object of the present invention to provide a circuit signal connection interface and the manufacturing method to provide a good quality on signal transmission.

It is another object of the present invention to provide a circuit signal connection interface and the manufacturing method with a greater electrical contact area.

It is still another object of the present invention to provide a circuit signal connection interface and the manufacturing method to match a dense layout of signal lines.

The present invention achieves these and other objectives by providing an electrical device with a better quality on signal transmission and with smaller size.

The circuit signal connection interface of present invention includes a first signal line, a second signal line, an insulation layer and a first conductive pad. The first and the second signal lines are disposed in parallel manner, and the insulation layer covers at least part of the second signal line. The first conductive pad couples with the first signal line and includes a first portion and a second portion. The first portion directly or indirectly couples with the first signal line, and both the first portion and the first signal line are disposed at the same side of the second signal line. The second portion couples to the first portion, and is disposed at the other side of the first portion. Insulation layer is disposed between the second signal line and the first conductive pad to prevent the second signal line and the first conductive pad from being contacted with each other.

Electronic device of the present invention includes circuit device and the circuit signal connection interface described above. Circuit device includes a first conductive convex and a second conductive convex. The first conductive convex and the second conductive convex are disposed in parallel manner, and they transmit the same signal from a signal source. The first conductive convex couples with the first portion of the first conductive pad, the second conductive convex couples with the second portion of the first conductive pad.

Manufacturing method of the circuit signal connection interface includes the following steps: forming a first signal line and a second signal line in a parallel manner; forming insulation layer to cover part of the second signal line; and, forming a first conductive pad to couple with the first signal line; meanwhile, separating the second signal line and the first conductive pad by the insulation layer. The step of forming first conductive pad includes at least two steps: forming a first portion to couple with the first signal line at the same side of the second signal line; and, forming a second portion to couple with the first portion, wherein the second portion at the different side of the first portion.

DETAILED DESCRIPTION OF THE PREFERRED EMBODIMENT

The present invention provides a circuit signal connection interface, the manufacturing method and electronic device using the circuit signal connection interface. The electronic device preferably includes display devices such as liquid crystal display panels or organic light emitting diodes (OLEDs). However, the electronic device can include other devices. In a preferred embodiment, the circuit signal connection interface of the present invention is used in a COG package circuit to be the interface for circuits to couple with. However, in other embodiments, other IC package methods including TAP and COF can be used. The COG and COF use anisotropic conductive films (ACFs) as the bonding material; however, in other embodiments, solder or tapes or other suitable materials can be bonding materials. Furthermore, the circuit signal connection interface of the present invention can be implemented on other circuits such as drive circuits.

Figure 1:
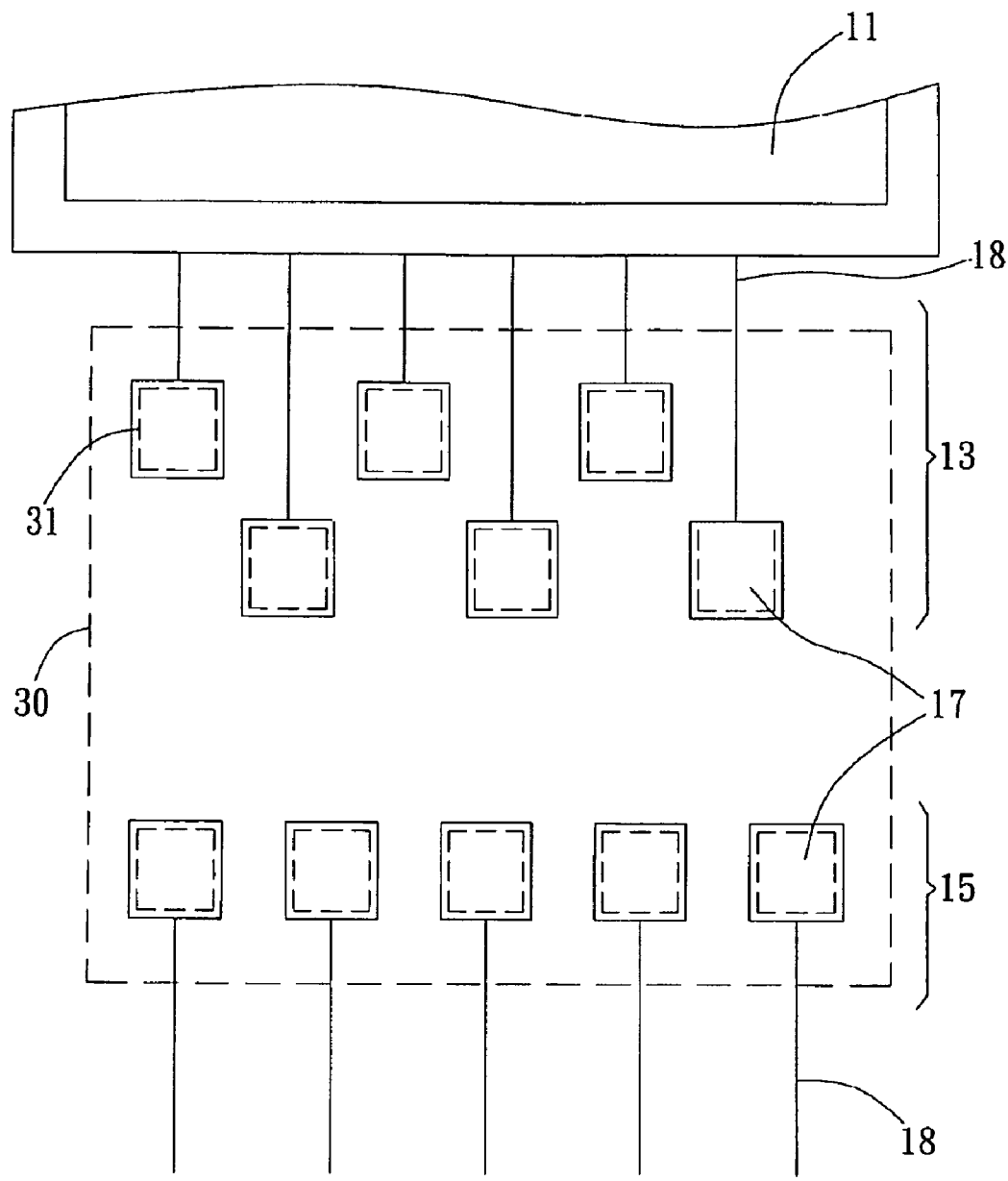
FIG. 1 shows a schematic view of conventional display device.
Figure 2:
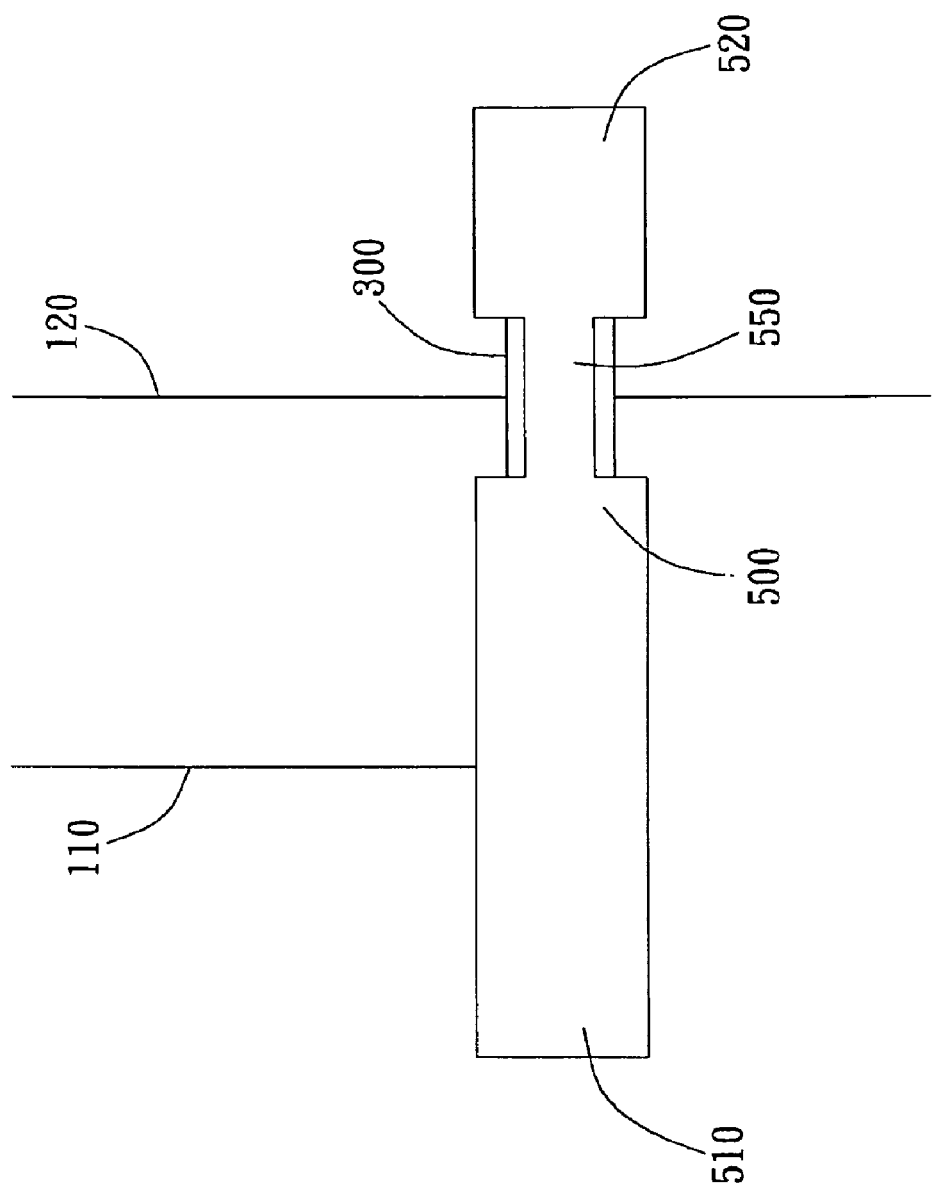
FIG. 2 is a schematic view of the circuit signal connection interface of the invention.

In the embodiment of FIG. 2, the circuit signal connection interface includes a first signal line 110, a second signal line 120, an insulation layer 300, and a first conductive pad 500. The first and the second signal lines 110, 120 are disposed in a juxtapose manner. In a preferred embodiment, the first and the second signal lines 110, 120 are parallel; however, in other embodiments, they can be non-parallel with similar stretching directions. The first and the second signal lines 110, 120 are preferably metal lines disposed on the circuit board 100, and the forming methods can be deposition, etching, adherence or other circuit manufacturing methods.

Figure 3:
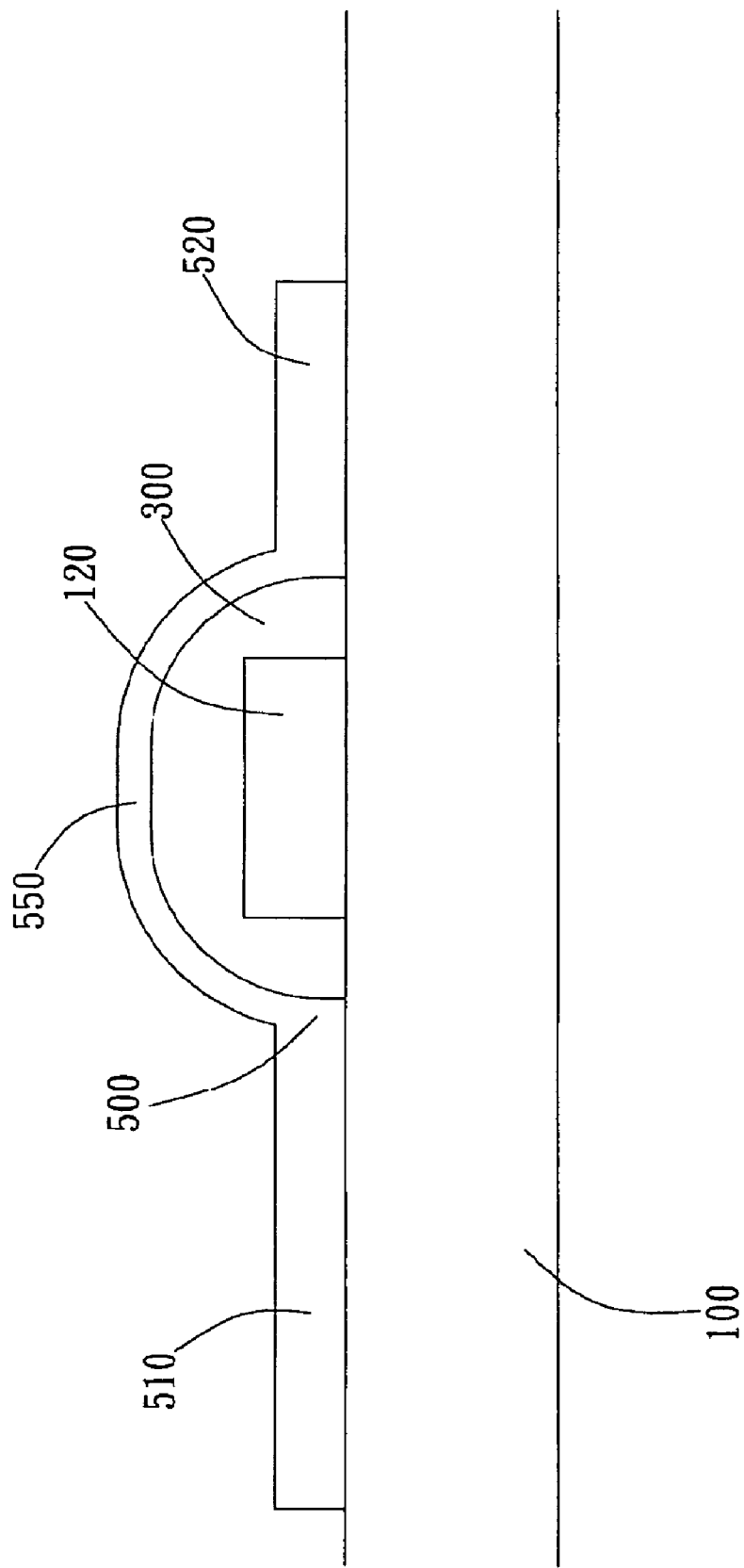
FIG. 3 is a cross-sectional view of the embodiment of FIG. 2.

As shown in FIG. 2, insulation layer 300 covers at least part of the second signal line 120; in other words, insulation layer 300 can also cover all of the second signal line 120. The position of insulation layer 300 is preferred to correspond to the first conductive pad 500. As FIG. 3 shows, insulation layer 300 and circuit board 100 both cover at least part of the second signal line 120, so as to prevent that part of the second signal line 120 from contacting with outside. Materials of insulation layer 300 are preferably compositions of nitrogen and silicon (SiNx).

The first conductive pad 500 couples with the first signal line 110. In a preferred embodiment, the first conductive pad 500 is made of Indium Tin Oxide (ITO). However, in other embodiments, the first conductive pad 500 can be made of metal or other conductive materials. As shown in FIGS. 2 and 3, the first conductive pad 500 includes a first portion 510 and a second portion 520. The first portion 510 directly or indirectly electrically couples with the first signal line 110, and the first portion 510 and the first signal line 110 are disposed at the same side of the second signal line 120. The second portion 520 couples with the first portion 510, and the second portion 520 and the first portion 510 are disposed at different sides of the first portion 510.

In the embodiments shown in FIGS. 2 and 3, the insulation layer 300 is disposed between the second signal line 120 and the first conductive pad 500, and separates the second signal line 120 and the first conductive pad 500. The first portion 510 and the second portion 520 of the first conductive pad 500 are disposed at two sides of the insulation layer 300 respectively. Furthermore, the first portion 510 and the second portion 520 are preferably with rectangular-shaped cover area. However, in other embodiments, shapes and sizes of the first portion 510 and the second portion 520 can be adjusted with different allocations.

In the embodiment of FIG. 2, the first conductive pad 500 includes a connecting line 550. Connecting line 550 traverses the second signal line 120, and couples with the first portion 510 and the second portion 520. Therefore, the second portion 520 can be electrically coupled with the first portion 510 and has the same signal with the first portion 510. Connecting line 550 is disposed on the insulation layer 300, and thus the insulation layer 300 is disposed between the second signal line 120 and the connecting line 550. The second signal line 120 can be separated from contacting with connecting line 550 because of the insulation layer 300.

The connecting line 550 is preferably made of metal. The forming method includes deposition, etching, adherence, and other circuit manufacturing methods. Furthermore, while the first conductive pad 500 is disposed across the second signal line 120, the overlapping part of the first conductive pad 500 and the second signal line 120 raise higher than other parts of the first conductive pad 500. Since width of the connecting line 550 is smaller than widths of the first portion 510 and the second portion 520, the raised portion where the first conductive pad 500 disposed across above the second signal line 120 has a smaller contact area. When the raised portion across above the second signal line 120 has a smaller strength receiving area, the chance to be conducted by the pressure from upper layer is decreased.

Figure 4:
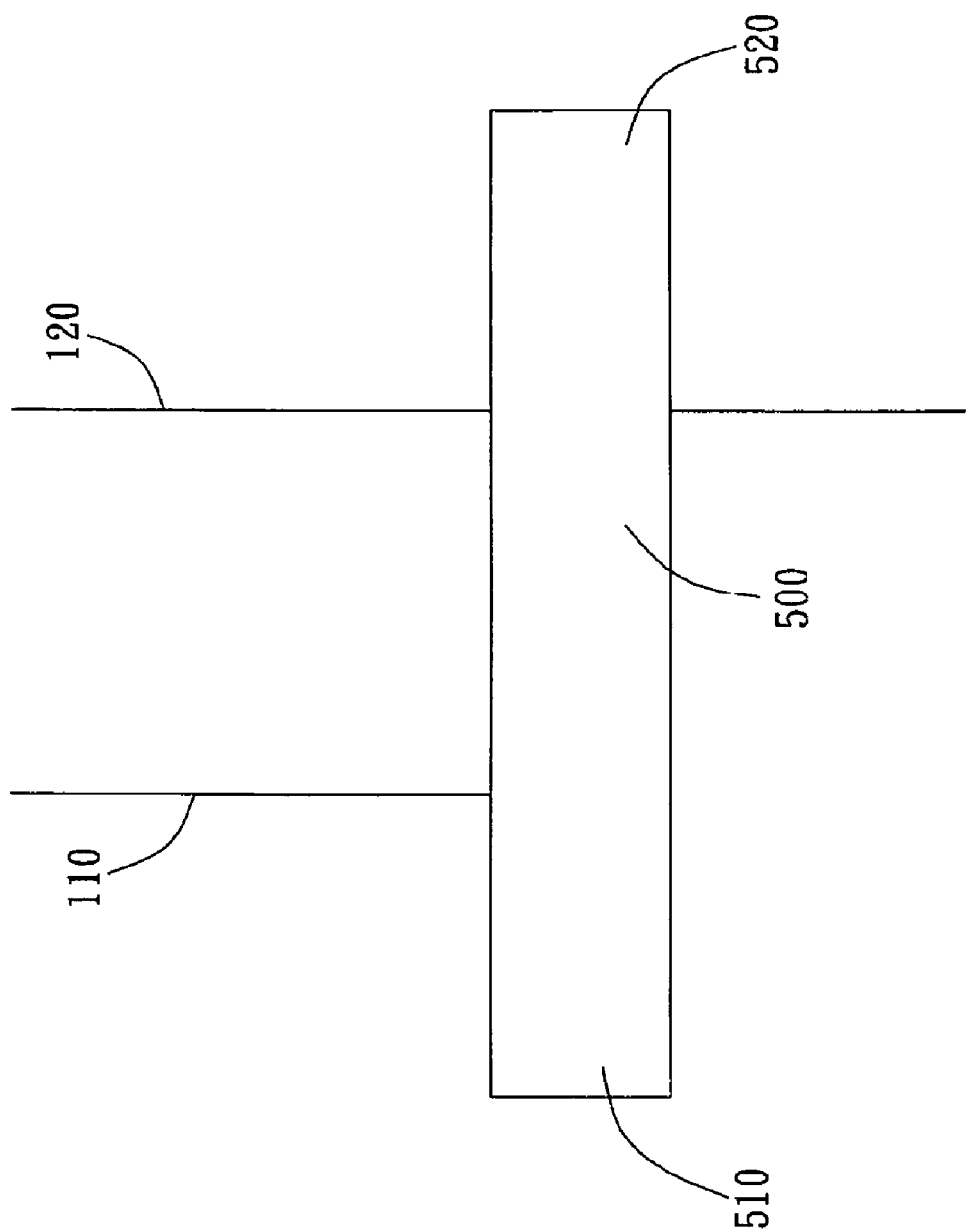
FIG. 4 is a schematic view of another embodiment of the circuit signal connection interface of the invention.

However, in the embodiment shown in FIG. 4, the first conductive pad 500 can be disposed without connecting line 550. In this embodiment, the first conductive pad 500 directly traverses two sides of the second signal line 120. In other words, the first conductive pad 500 is a complete conductive pad, and the overlapping part of the first conductive pad 500 and the second signal line 120 has the same width with widths of other parts. The first portion 510 and the second portion 520 of the first conductive pad 500 are disposed at two sides of the second signal line 120, and the first portion 510 and the second portion 520 directly couple together.

Figure 5:
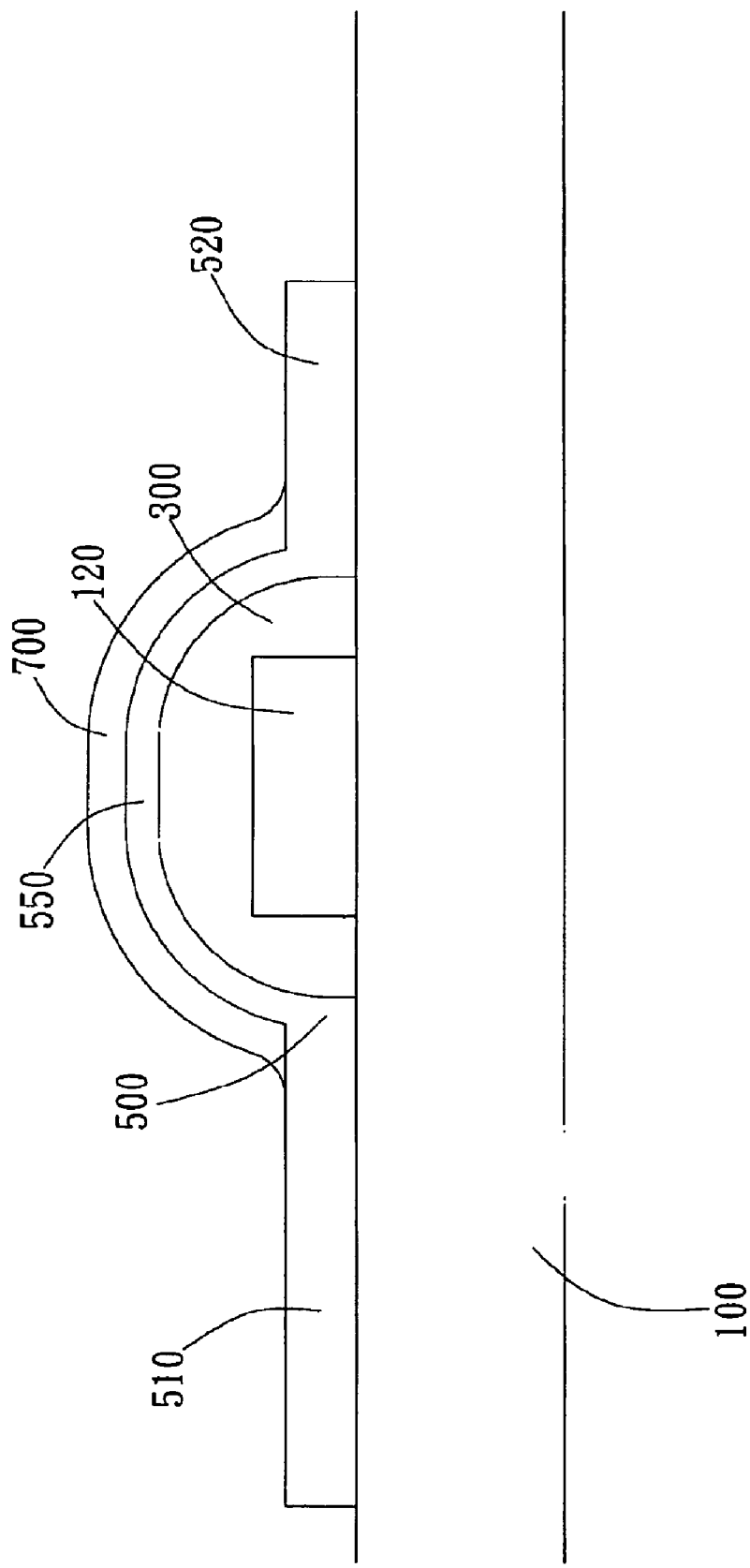
FIG. 5 is a cross-sectional view of one embodiment with protective layer.

In the embodiment shown in FIG. 5, the circuit signal connection interface further includes a protective layer 700. The protective layer 700 is disposed at the position where the first conductive pad 500 traverses the second signal line 120; in other words, the protective layer 700 is disposed above the overlapping part of the first conductive pad 500 and the second signal line 120. As shown in FIG. 5, the first conductive pad 500 includes a connecting line 550 connected to the first portion 510 and the second portion 520 respectively. At this time the protective layer 700 covers the connecting line 550. However, in other embodiments, the first conductive pad 500 is disposed without connecting line 550, so the protective layer 700 directly covers the overlapping part of the first conductive pad 500 and the second signal line 120.

Protective layer 700 is preferably made of Indium Tin Oxide (ITO); however, in other embodiments, protective layer 700 can be made of other materials. Protective layer 700 can strengthen the whole structure against pressure, and help to avoid damage caused by the pressure from the upper layer to the lower layer of the protective layer 700. In other words, connections among the first conductive pad 500, the insulation layer 300, the second signal line 120 and the elements described above can be protected.

Figure 6:
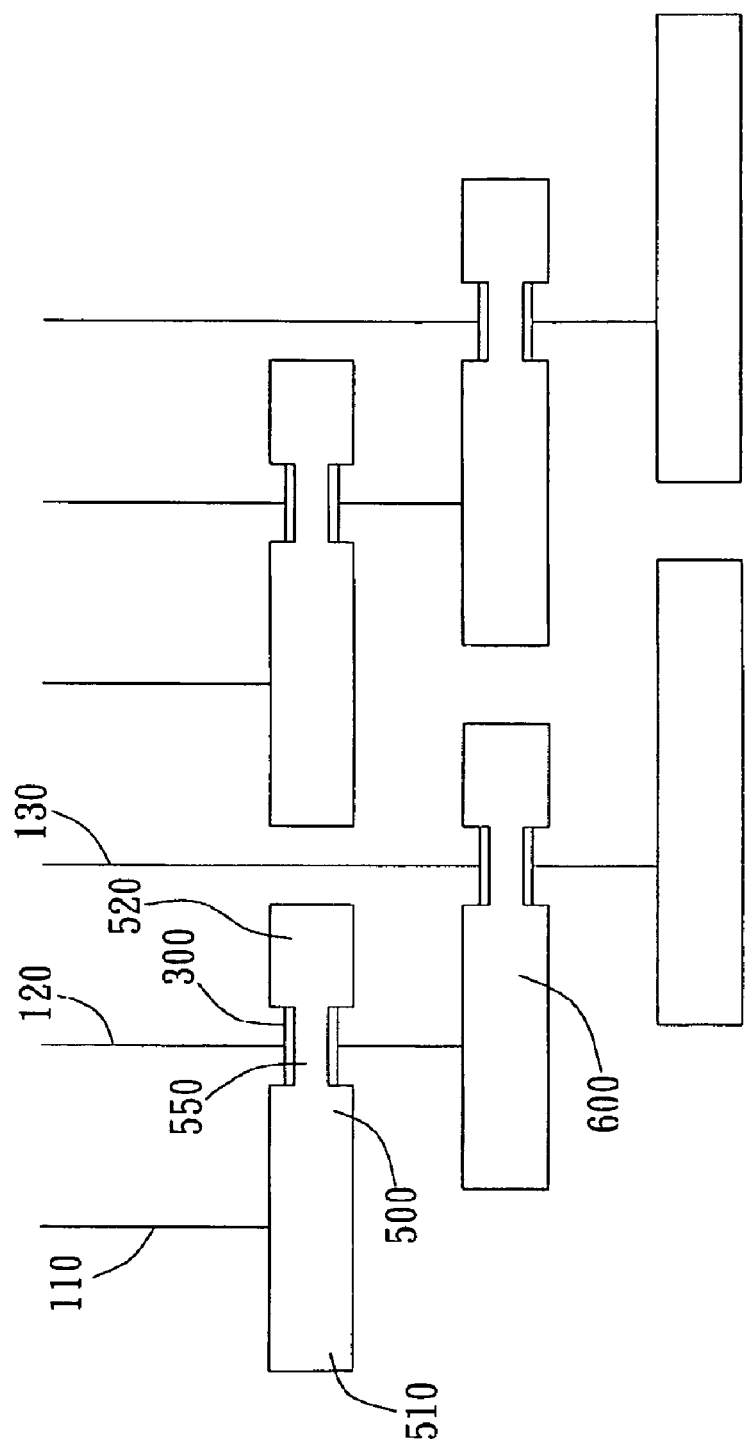
FIG. 6 is a schematic view of another embodiment of the circuit signal connection interface of the invention.

In the embodiment shown in FIG. 6, the circuit signal connection interface further includes a third signal line 130 and a second conductive pad 600. The third signal line 130 is juxtaposed with the second signal line 120, and the first signal line 110 and the third signal line 130 are disposed at two sides of the second signal line 120. The second portion 520 is disposed between the second signal line 120 and the third signal line 130. In a preferred embodiment, the third signal line 130 is parallel to the second signal line 120; however, in other embodiments, they can be non-parallel with similar stretching directions. The third signal line 130 is preferred to be metal signal line on the circuit board 100, and the forming methods can be deposition, etching, adherence or other circuit manufacturing methods.

The second conductive pad 600 couples with the second signal line 120 and is juxtaposed with the first conductive pad

500. Furthermore, the second signal line 120 passes through the part overlapped with the first conductive pad 500 and couples with the second conductive pad 600. In a preferred embodiment, the second conductive pad 600 is parallel to the first conductive pad 500; however, in other embodiments, the second conductive pad 600 and the first conductive pad 500 are non-parallel with similar stretching directions. The second conductive pad 600 preferably has a rectangular-shaped cover area; however, in other embodiments, shape and size of the second conductive pad 600 can be adjusted with different allocations.

As shown in FIG. 6, an insulation layer 300 covers the third signal line 130. The second conductive pad 600 traverses the third signal line 130 above the insulation layer 300. That is, part of the second conductive pad 600 is disposed at one side of the third signal line 130, and another part of the second conductive pad 600 is disposed on the other side of the third signal line 130. Insulation layer 300 is disposed between the third signal line 130 and the second conductive pad 600, and separates the third signal line 130 and the second conductive pad 600.

Figure 7:
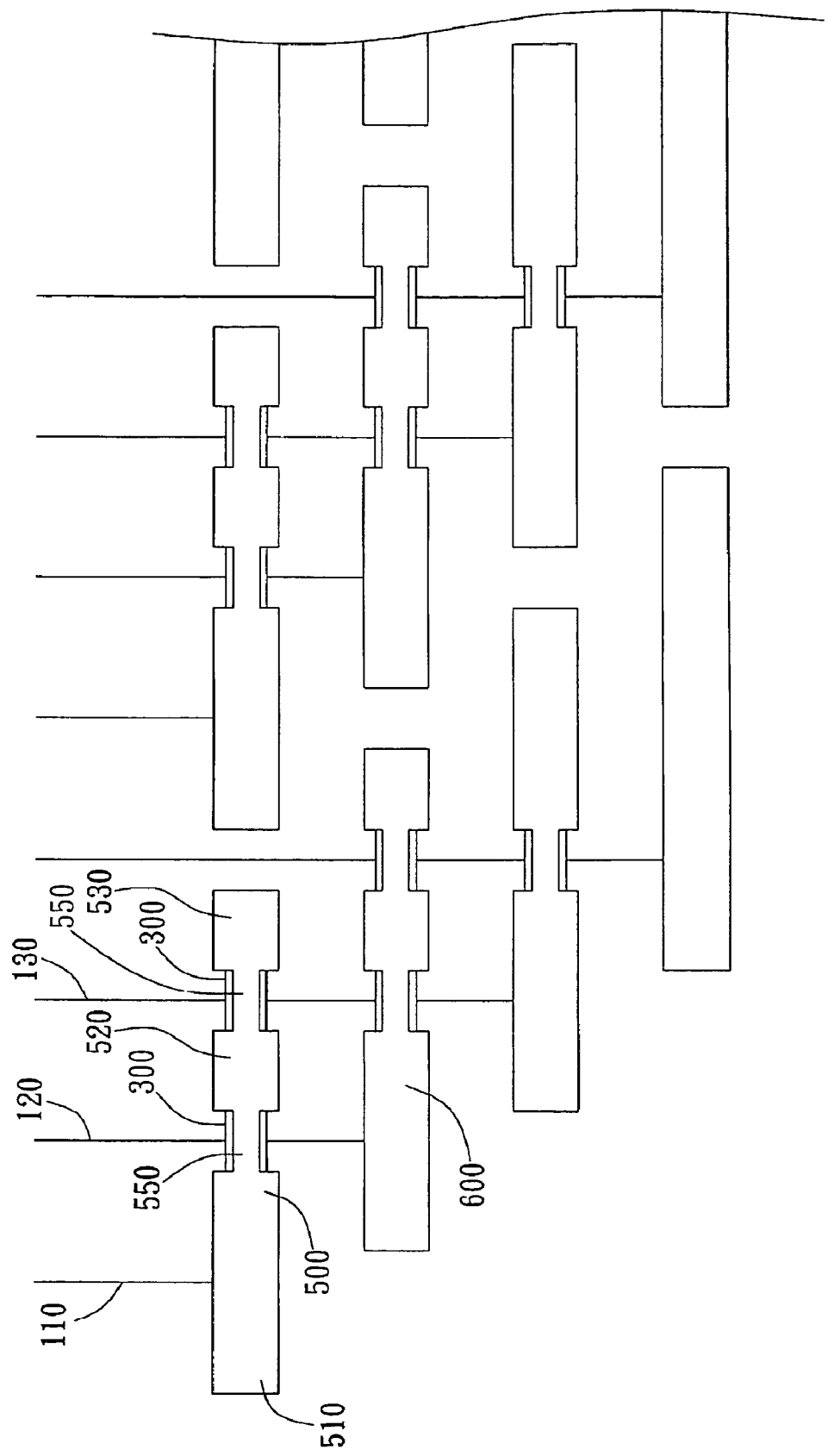
FIG. 7 shows a schematic view of first conductive pad in another embodiment of the invention.

In the embodiment shown in FIG. 7, the first conductive pad 500 further traverses two sides of the third signal line 130. The insulation layer 300 is disposed between the first conductive pad 500 and the third signal line 130 to separate the first conductive pad 500 and the third signal line 130. In this embodiment, the first conductive pad 500 further includes a third portion 530. The third portion 530 and the second portion 520 are disposed at different sides of the third signal line 130 and couple with each other. In this embodiment, the third portion 530 couples with the second portion 520 via connecting line 550; however, in other embodiments, the third portion 530 can directly couple with the second portion 520.

Figure 8:
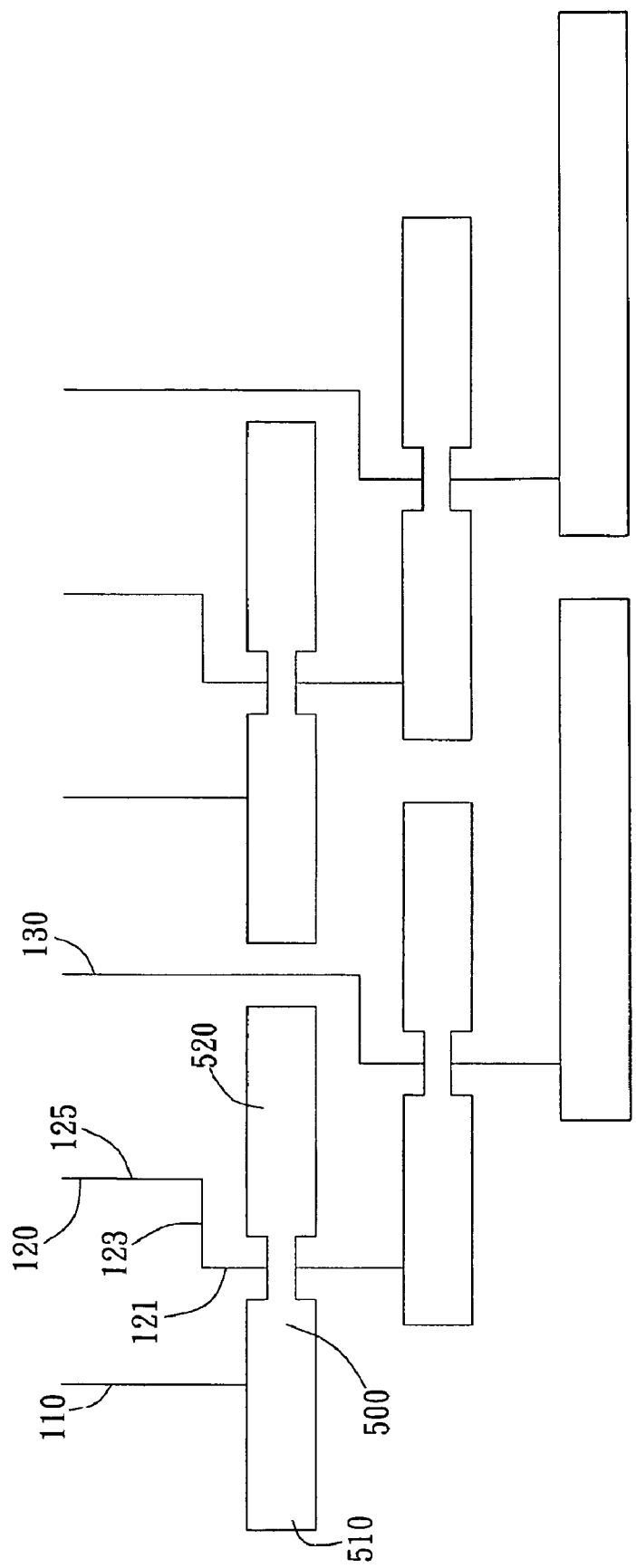
FIG. 8 shows a schematic view of second signal line in another embodiment of the invention.

In the embodiment shown in FIG. 8, the second signal line 120 extends in a bending manner. The second signal line 120 includes a front part 121, a bending part 123 and a tail part 125. The front part 121 is preferably parallel to the third signal line 130, and is traversed by the first conductive pad 500. The bending part 123 extends from the front part 121 and bends towards the third signal line 130. In this embodiment, the bending part 123 is perpendicular to the front part 121. The tail part 125 extends and bends from the bending part 123 in the opposite direction to the direction the bending part 123 extends. Also, the tail part 125 is preferably parallel to the third signal line 130. In this way, the distance between the front part 121 and the first signal line 110 is smaller than the distance between the tail part 125 and the first signal line 110. Furthermore, in this embodiment, the distance between the first signal line 110 and the tail part 125 equals to the distance between the third signal line 130 and the tail part 125 of the second signal line 120. Therefore, the first portion 510 and the second portion 520 of the first conductive pad 500 have the same length. However, distances mentioned above can be changed by changing the length of the bending part 123.

Figure 9A:
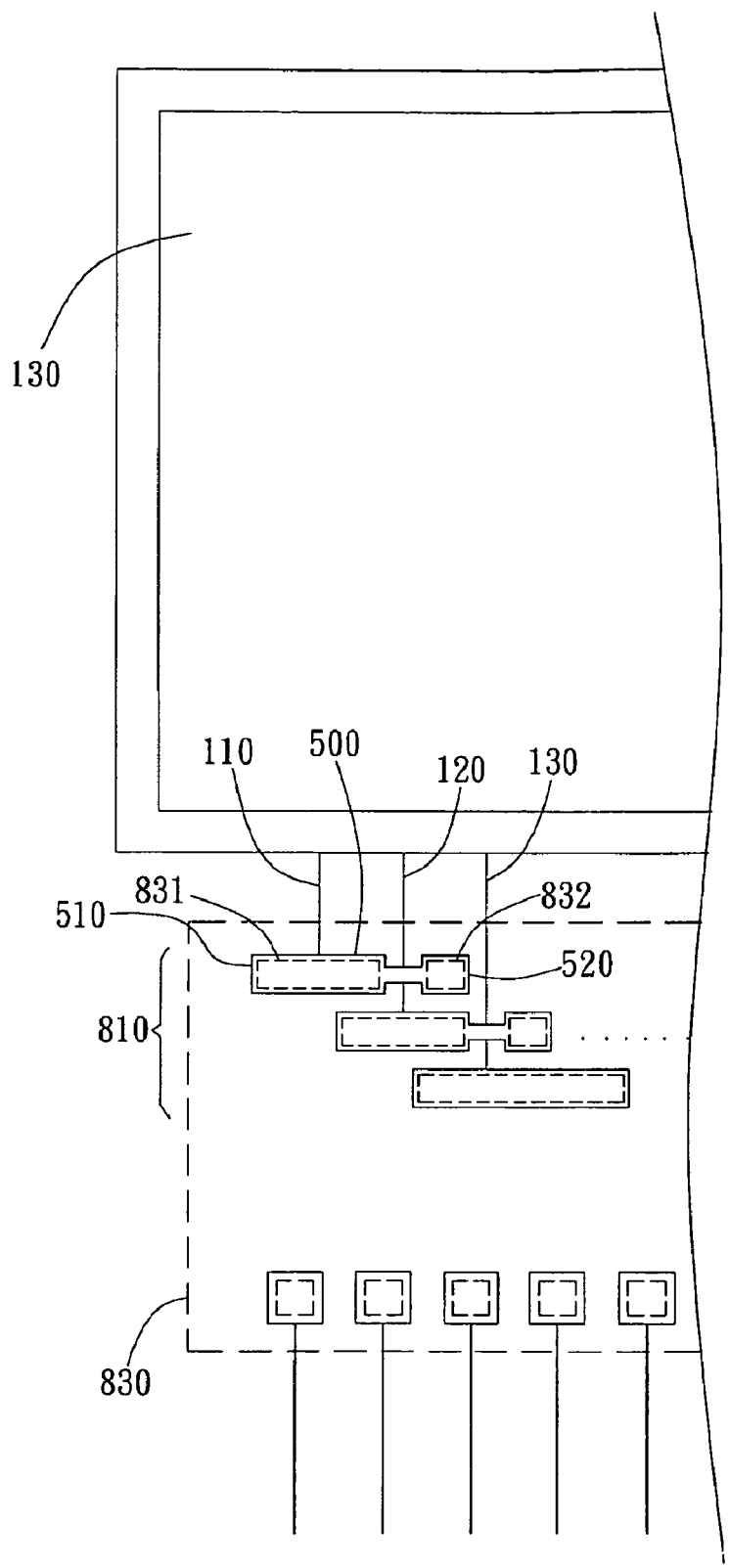
FIG. 9a is a schematic view of electronic device of the invention.
Figure 9B:
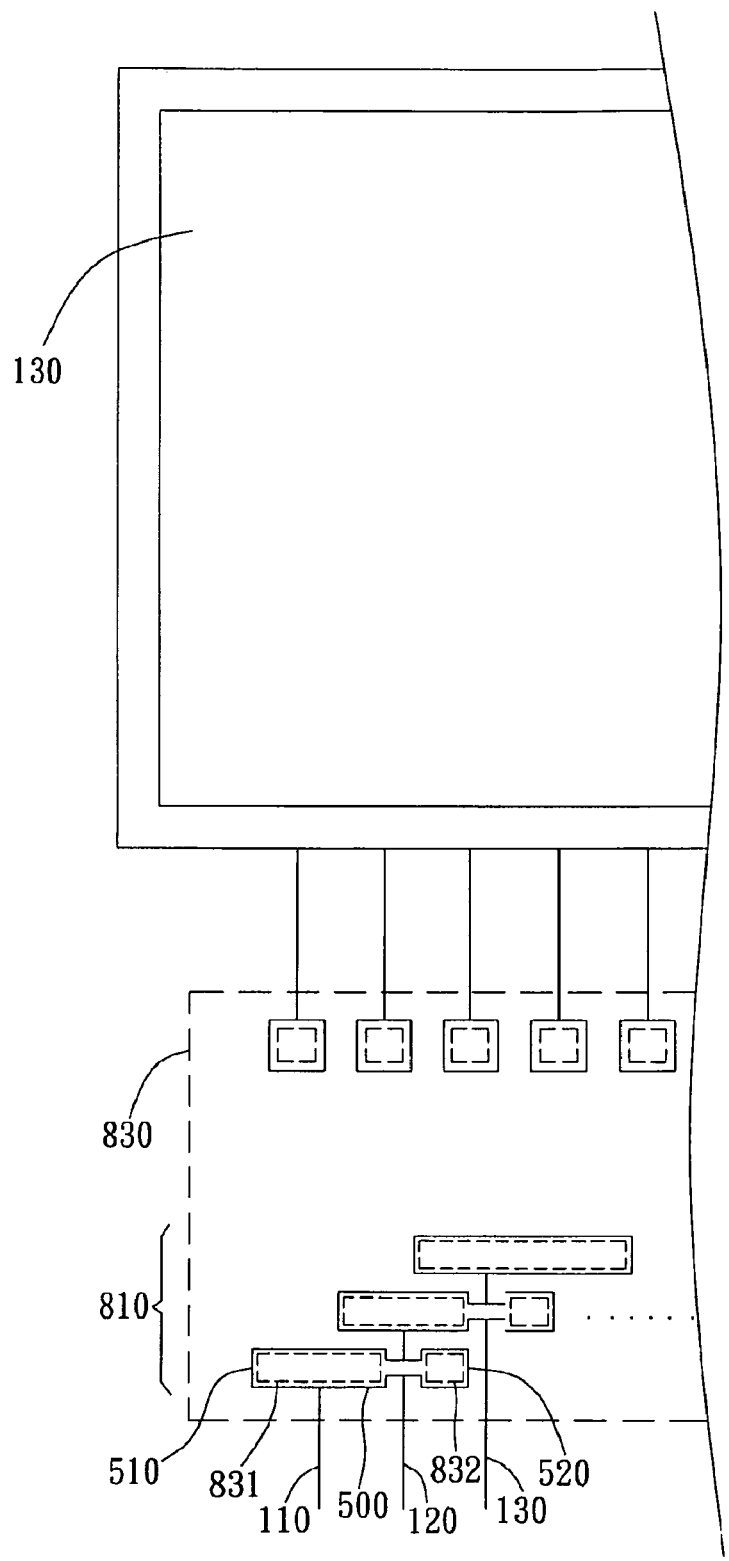
FIG. 9b is a schematic view of electronic device in another embodiment of the invention.

FIG. 9a shows a schematic view of the electronic device of the present invention. The electronic device includes the circuit signal connection interface 810 described above and a circuit device 830. In this embodiment, the electronic device is a display device, the circuit signal connection interface 810 implements at the signal output end of the display device, and the circuit device 830 is a drive circuit. After process of the circuit device 830, signals go to display panel 840 of the display device from the signal output end. However, in other embodiments, as shown in FIG. 9b, the circuit signal connection interface 810 can also implement at the signal input end of the display device and connect to the circuit device 830.

Moreover, the circuit signal connection interface 810 can implement in the conductive bump of the circuit device 830.

Figure 9C:
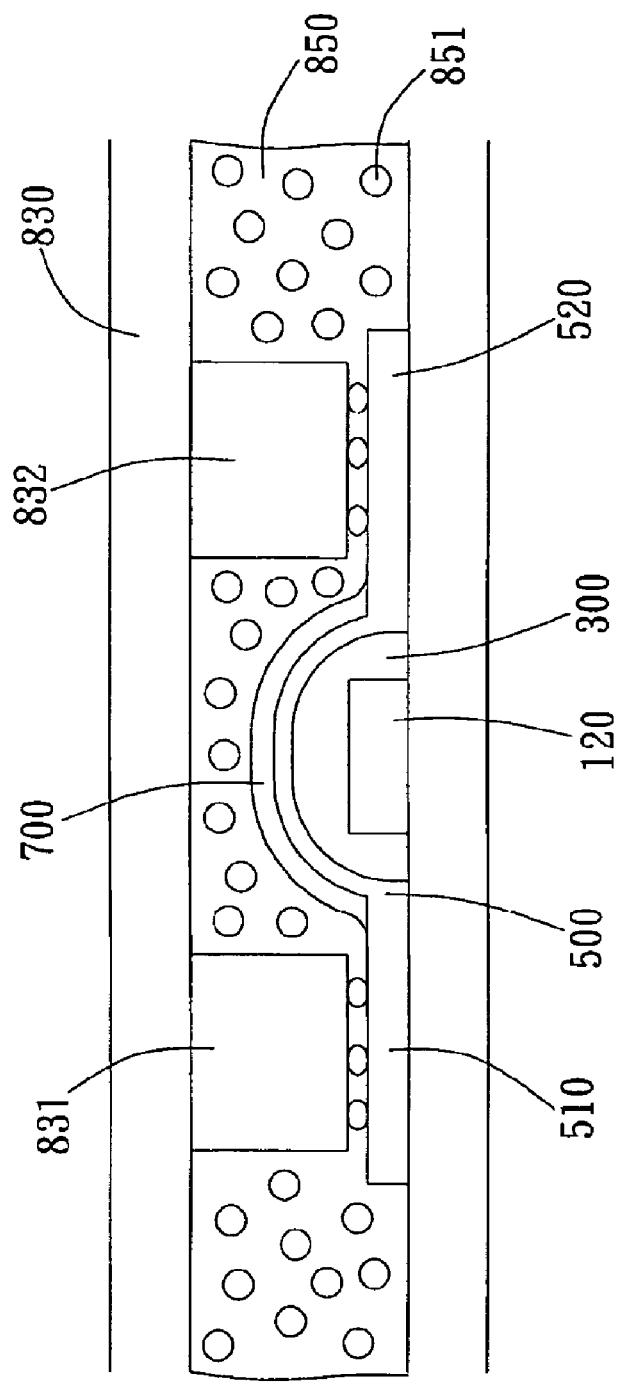
FIG. 9c is a cross-sectional view of the embodiment of FIG. 9b.

As shown in FIG. 9c, the circuit device 830 includes a first conducting bump 831 and a second conducting bump 832. The first conducting bump 831 and the second conducting bump 832 are parallel and transmit the same signal from the same signal source. The first conducting bump 831 of the circuit device 830 electrically couples with the first portion 510 of the first conductive pad 500, the second conducting bump 832 couples with the second portion 520. In a preferred embodiment, a conductive film layer 850 is disposed between the circuit device 830 and the circuit signal connection interface 810 so that the first conducting bump 831 and the second conducting bump 832 are electrically connected to the first conductive pad 500 respectively. The conductive film layer 850, such as ACF, preferably has conductive particles 851; however, in other embodiments, conductive particles 851 can be omitted in the conductive film layer 850.

As shown in FIG. 9c, since the first conducting bump 831 and the second conducting bump 832 are disposed at two sides of the second signal line 120, the first conducting bump 831 and the second conducting bump 832 won't directly push the overlapping part of the first conductive pad 500 and the second signal line 12. In this way, the conductive film layer 850 will not cause damage to the overlapping part. However, in other embodiments, the first conducting bump 831 and the second conducting bump 832 can be combined as a single conducting bump 835 electrically coupling with the first conductive pad 500. At this time a protective layer 700 is preferably disposed on the first conductive pad 500 against pressure from the conducting bump 835 and the conductive film layer 850.

Figure 10:
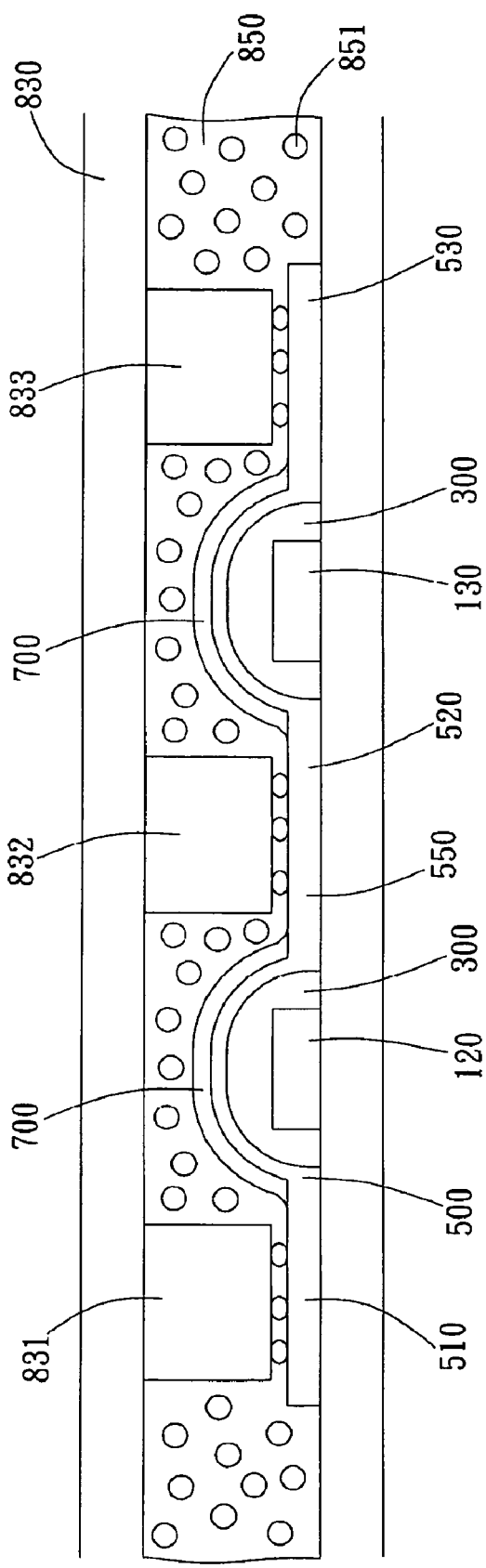
FIG. 10 is a schematic view of electronic device in another embodiment of the invention.

In the embodiment shown in FIG. 10, circuit device 830 includes a third conducting bump 833 parallel to the first conducting bump 831 and the second conducting bump 832, and, the second and third conducting bump 832, 833 are disposed at two sides of the third signal line 130. As shown in FIG. 10, the first conducting bump 831 of the circuit device 830 electrically couples with the first portion 510, the second conducting bump 832 electrically couples with the second portion 520, and the third conducting bump 833 electrically couples with the third portion 530.

Figure 11:
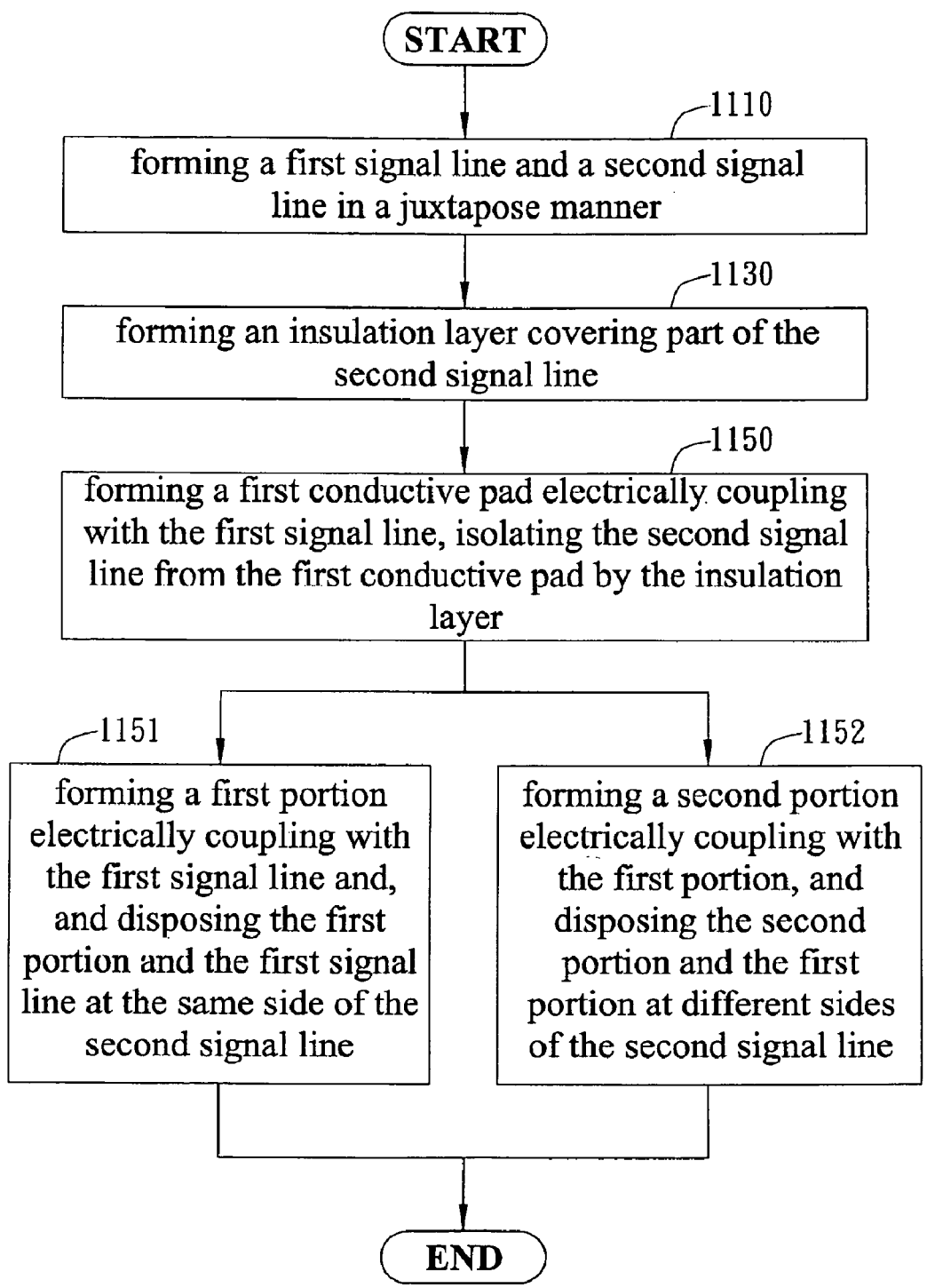
FIG. 11 is a flow chart of manufacturing the circuit signal connection interface of the invention.

In the embodiment shown in FIG. 11, manufacturing method of the circuit signal connection interface includes step 1110, forming a first signal line 110 and a second signal line 120 in a juxtapose manner. The first and the second signal lines 110, 120 are preferably metal lines, the forming methods can be deposition, etching, adherence or other circuit manufacturing methods. In a preferred embodiment, the first and the second signal lines 110, 120 are parallel; however, in other embodiments, they can be non-parallel with similar extending directions. Moreover, the first and the second signal lines 110, 120 are preferably made in one manufacturing step, however in other embodiments they can be made in different steps.

Step 1130 includes forming an insulation layer 300 covering part of the second signal line 120. However, the insulation layer 300 can cover all of the second signal line 120. The insulation layer 300 can cover and prevent part of the second signal line 120 from contacting with outside. Materials of insulation layer 300 are preferably compositions of nitrogen and silicon.

Step 1150 includes forming a first conductive pad 500 electrically coupling with the first signal line 110. Meanwhile, the insulation layer 300 is disposed between the second signal line 120 and the first conductive pad 500. In a preferred embodiment, the first conductive pad 500 is made of Indium Tin Oxide (ITO). However, in other embodiments, the first conductive pad 500 can be made of metal or other conductive materials. The forming methods can be deposition, etching, adherence or other circuit manufacturing methods. Also, the steps can be combined with other steps or separated into more steps if needed.

Step 1150 includes at least two steps as follows: forming a first portion 510 electrically coupling with the first signal line 110, and the first portion 510 and the first signal line 110 are at the same side of the second signal line 120 (step 1151). Moreover, the step further includes forming a second portion 520 electrically coupling with the first portion 510, and disposing the second portion 520 and the first portion 510 at different sides of the second signal line 120 (step 1152). Step 1151 and step 1152 are done in one manufacturing process; however, in different embodiments, these two steps can be done in different time and process.

Figure 12:
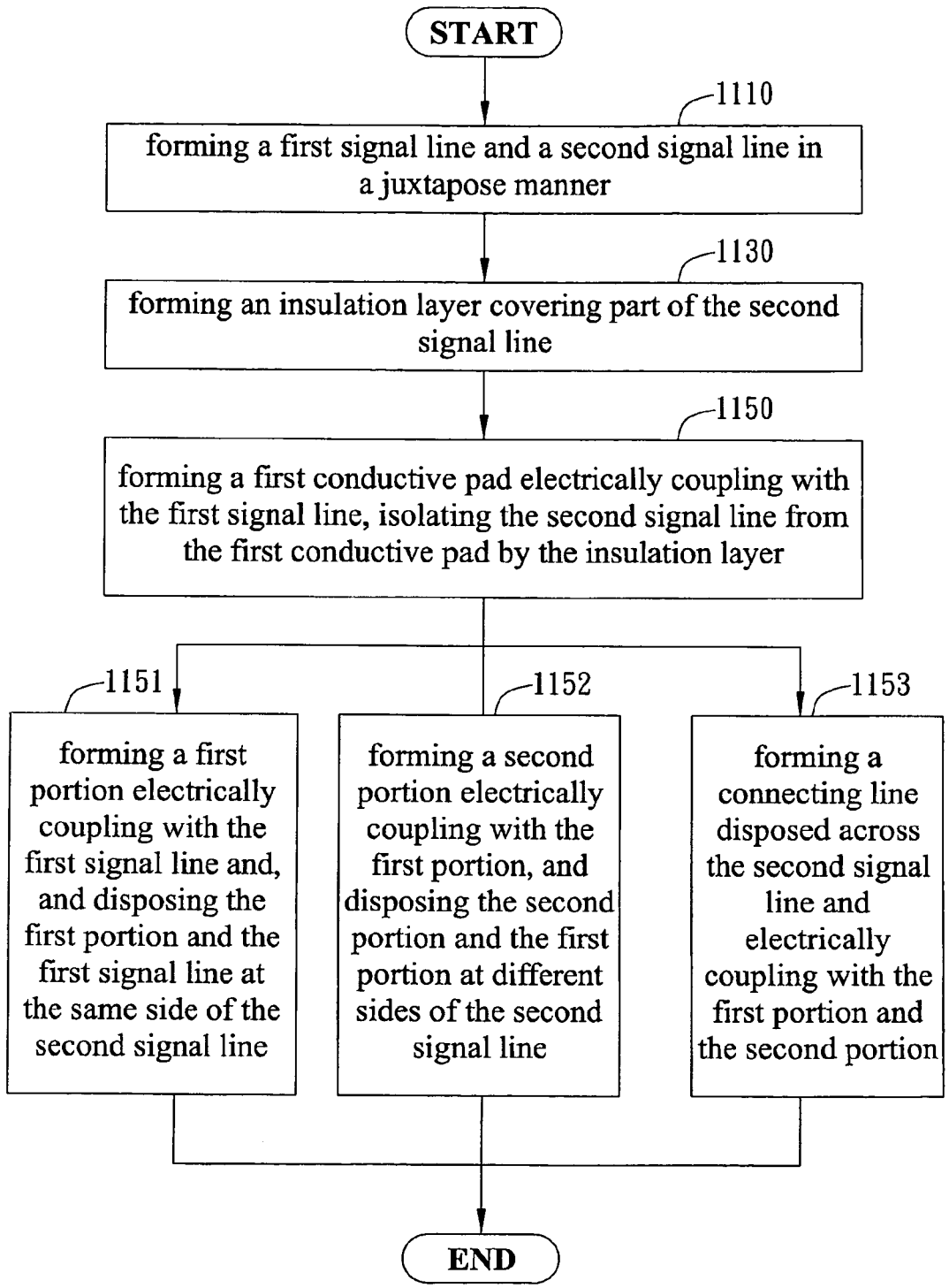
FIG. 12-15 are flow charts of different embodiments of manufacturing the circuit signal connection interface of the invention.

In the embodiment shown in FIG. 12, step 1150 further includes forming a connecting line 550 disposed across the second signal line 120 and electrically coupling with the first portion 510 and the second portion 520 (step 1153). Furthermore, disposing the insulation layer 300 between the second signal line 120 and the connecting line 550. The connecting line 550 is preferably made of metal; the forming method includes deposition, etching, adherence or other circuit manufacturing methods. Other embodiments may not include step of forming the connecting line 550. Instead, the step of forming the first conductive pad 500 includes directly traversing two sides of the second signal line 120. Step 1153 is preferred to be done simultaneously with step 1151 and step 1152; however, in other embodiments, step 1153 can be done after the step 1151 and step 1152.

Figure 13:
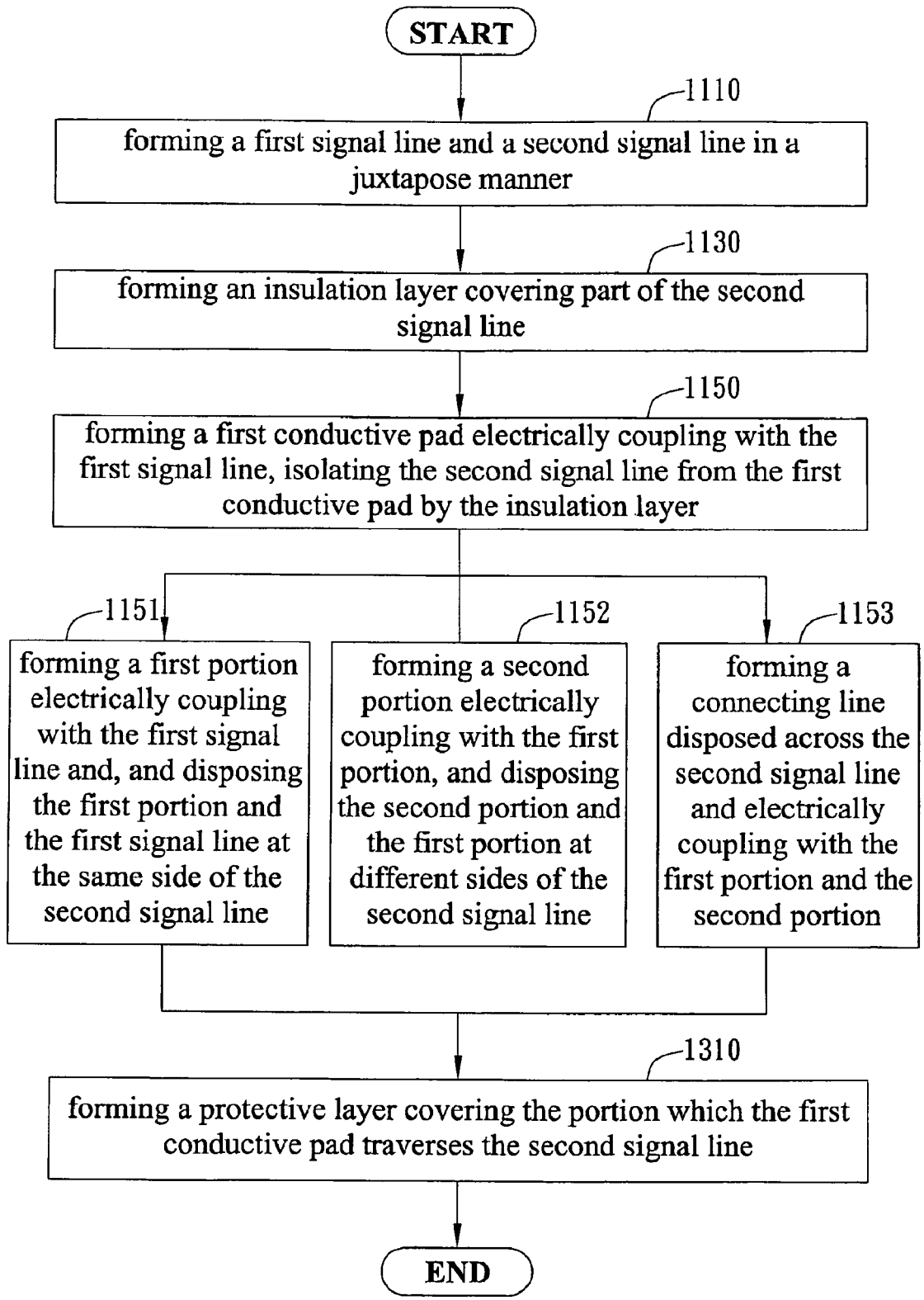

In the embodiment shown in FIG. 13, the method further includes forming a protective layer 700 covering the portion which the first conductive pad 500 traverses the second signal line 120 (step 1310). In other words, the protective layer 700 is disposed above the overlapping part of the first conductive pad 500 and the second signal line 120. In a preferred embodiment, the first conductive pad 500 includes a connecting line 550 electrically connected to the first portion 510 and the second portion 520 respectively. At this time the protective layer 700 covers the connecting line 550. However, in other embodiments, while the first conductive pad 500 is disposed without connecting line 550, the protective layer 700 directly covers the overlapping part of the first conductive pad 500 and the second signal line 120. The protective layer 700 is preferably made of Indium Tin Oxide (ITO); however, in other embodiments, protective layer 700 can be made of other materials.

Figure 14:
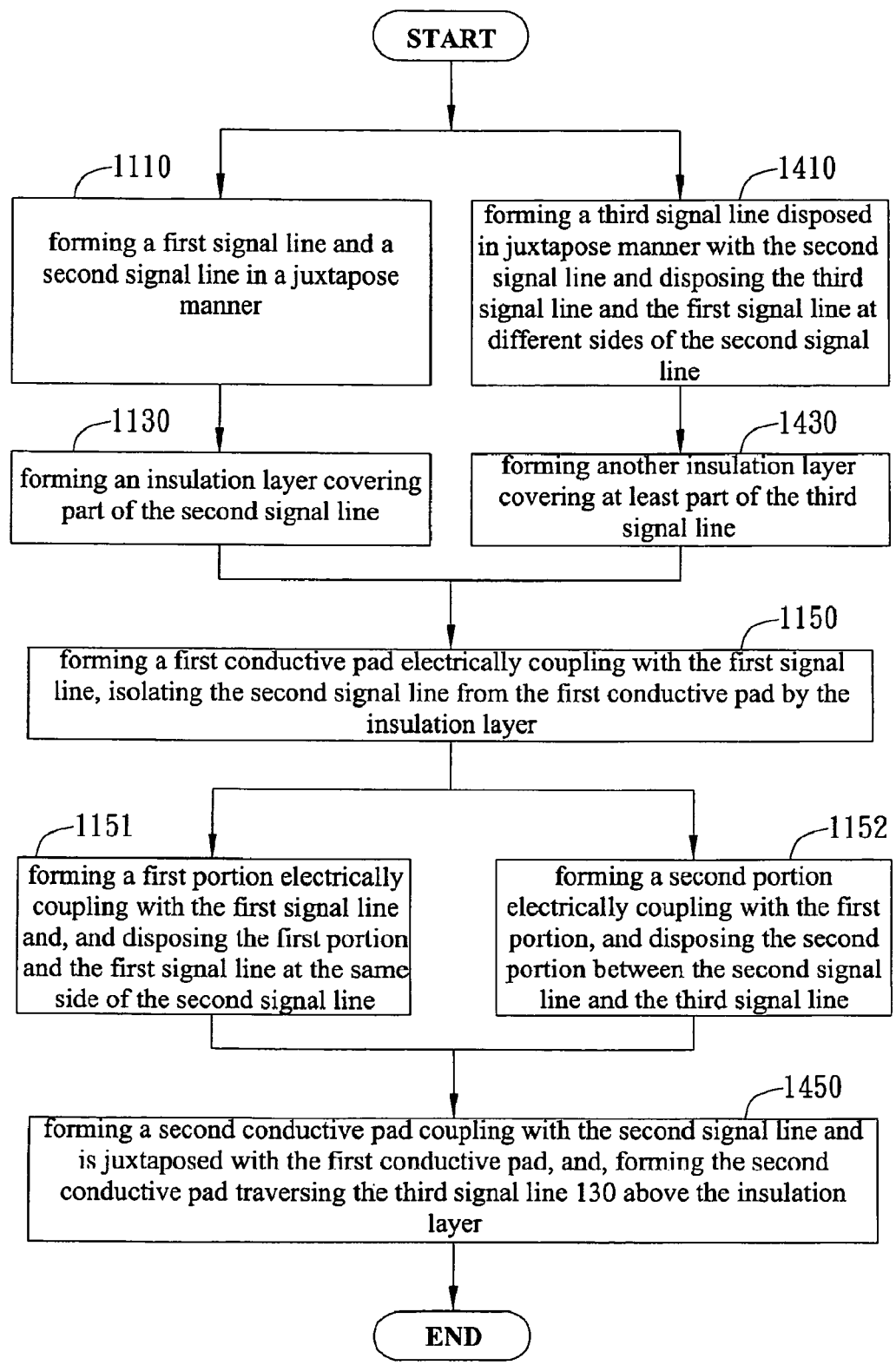

In the embodiment shown in FIG. 14, the method further includes step 1410, forming a third signal line 130 disposed in juxtapose manner with the second signal line 120, and disposing the third signal line 130 and the first signal line 110 at different sides of the second signal line 120. The third signal line 130 is preferred to be metal signal lines, and the forming methods can be deposition, etching, adherence or other circuit manufacturing methods. The third signal line 130 is preferably formed simultaneously with the first signal line 110 and the second signal line 120; however, in different embodiments, the signal lines can be made in different steps.

Step 1430 includes forming another insulation layer 300 covering at least part of the third signal line 130. Step 1450 includes forming a second conductive pad 600 coupling with the second signal line 120 and is juxtaposed with the first conductive pad 500. The second signal line 120 passes through the part overlapped with the first conductive pad 500 and couples with the second conductive pad 600. Furthermore, this step further includes forming the second conductive pad 600 traversing the third signal line 130 above the insulation layer 300; therefore, the insulation layer 300 can prevent the third signal line 130 and the second conductive pad 600 from being contacted with each other.

Figure 15:
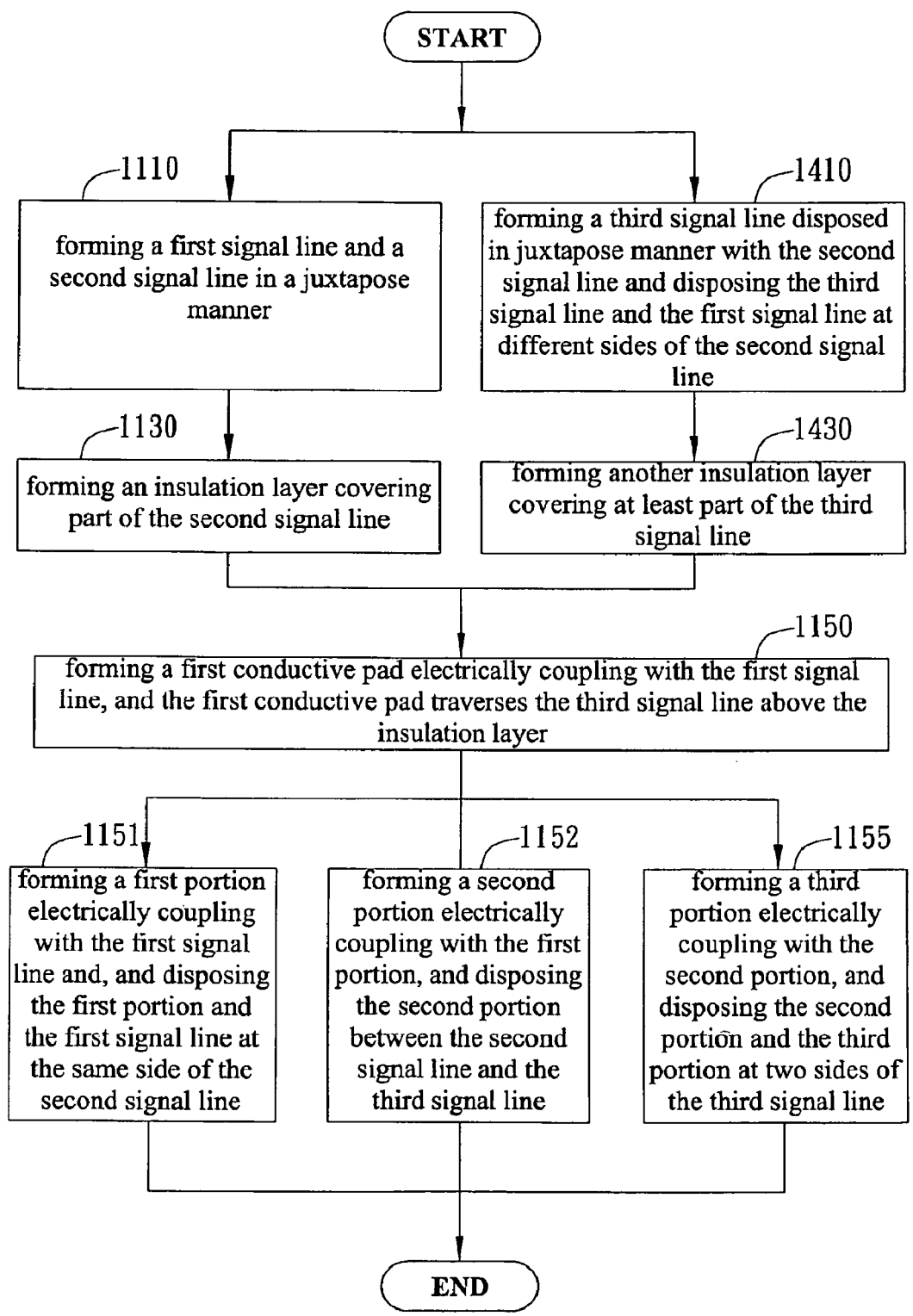

In the embodiment shown in FIG. 15, the method further includes step 1410 and step 1430. The step 1150 of forming the first conductive pad 500 further includes forming the first conductive pad 500 traversing the third signal line 130. And, the step includes forming the insulation layer 300 to separate the third signal line 130 and first conductive pad 500. Furthermore, step 1150 also includes step 1155, forming a third portion 530 coupling with the second portion 520 in such a way that the third portion 530 and the second portion 520 are disposed at two sides of the third signal line 130.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A circuit signal connection interface comprising:
   a first signal line;
   a second signal line juxtaposed with the first signal line;
   an insulation layer covering at least part of the second signal line; and
   a first conductive pad electrically coupling with the first signal line, wherein the insulation layer is disposed between the second signal line and the first conductive pad to prevent the second signal line and the first conductive pad from being electrically contacted, the first conductive pad including:
   a first portion electrically coupled with the first signal line, the first portion and the first signal line being at the same side of the second signal line;
   a second portion electrically coupled with the first portion, the first portion and the second portion being at two sides of the second signal line respectively.

2. The circuit signal connection interface of claim 1, wherein the first conductive pad traverses two sides of the second signal line.

3. The circuit signal connection interface of claim 1, further comprising a third signal line juxtaposed with the second signal line, the third signal line and the first signal line being disposed at two sides of the second signal line respectively, wherein the second portion of the first conductive pad is disposed between the second signal line and the third signal line.

4. The circuit signal connection interface of claim 1, wherein the second signal line includes:
   a front part traversed by the first conductive pad;
   a bending part extending from the front part and bending towards the third signal line; and
   a tail part extending and bending from the bending part in the direction opposite to the direction the bending part bends, wherein the distance between the front part and the first signal line is smaller than the distance between the tail part and the first signal line.

5. The circuit signal connection interface of claim 1, wherein the first conductive pad further includes a connecting line traversing the second signal line and electrically coupling with the first portion and the second portion, and the insulation layer is disposed between the second signal line and the connecting line.

6. The circuit signal connection interface of claim 5, further comprising a protective layer covering the connecting line.

7. The circuit signal connection interface of claim 1, further comprising a protective layer covering the overlapping part of the first conductive pad and the second signal line.

8. The circuit signal connection interface of claim 7, wherein the protective layer includes a layer of indium tin oxide (ITO).

9. The circuit signal connection interface of claim 1, further comprising a second conductive pad electrically coupled with the second signal line and juxtaposed with the first conductive pad.

10. The circuit signal connection interface of claim 9, further comprising a third signal line juxtaposed with the second signal line, the third signal line and the first signal line being disposed at two sides of the second signal line respectively, wherein a insulation layer covers the third signal line, the second conductive pad traverses two sides of the third signal line, and the insulation layer isolates the third signal line from the second conductive pad.

11. The circuit signal connection interface of claim 1, further comprising a third signal line juxtaposed with the second signal line, the third signal line and the first signal line being disposed at two sides of the second signal line respectively, wherein a insulation layer covers the third signal line, the first conductive pad traverses two sides of the third signal line, and the insulation layer isolates the third signal line from the first conductive pad.

12. The circuit signal connection interface of claim 11, wherein the first conductive pad includes:
- a first portion electrically coupled with the first signal line, the first portion and the first signal line being at the same side of the second signal line;
- a second portion electrically coupled with the first portion, between the second signal line and the third signal line; and
- a third portion electrically coupled with the second portion, the third portion and the second portion being at two sides of the third signal line.

13. An electronic device, comprising:
a circuit signal connection interface including:
- a first signal line;
- a second signal line juxtaposed with the first signal line;
- an insulation layer covering at least part of the second signal line; and
- a first conductive pad electrically coupling with the first signal line, wherein the insulation layer is disposed between the second signal line and the first conductive pad to prevent the second signal line and the first conductive pad from being contacted, the first conductive pad includes:
  - a first portion electrically coupled with the first signal line, the first portion and the first signal line being at the same side of the second signal line;
  - a second portion electrically coupled with the first portion, the first portion and the second portion being at two sides of the second signal line respectively; and
- a circuit device electrically coupled with the circuit signal connection interface, the circuit device including:
  - a first conducting bump; and
  - a second conducting bump being parallel to the first conducting bump, wherein the first conducting bump couples with the first portion, and the second conducting bump couples with the second portion.

14. The electronic device of claim 13, wherein the circuit device includes a drive circuit.

15. The electronic device of claim 13, wherein the circuit signal connection interface comprises a circuit signal output end.

16. The electronic device of claim 13, wherein the circuit signal connection interface comprises a circuit signal input end.

17. The electronic device of claim 13, wherein the first conductive pad traverses two sides of the second signal line.

18. The electronic device of claim 13, further comprising a third signal line juxtaposed with the second signal line, the third signal line and the first signal line being disposed at two sides of the second signal line respectively, the second portion of the first conductive pad being disposed between the second signal line and the third signal line.

19. The electronic device of claim 13, wherein the first conductive pad further includes a connecting line traversing the second signal line and coupling with the first portion and the second portion, and the insulation layer is disposed between the second signal line and the connecting line.

20. The electronic device of claim 19, further comprising a protective layer covering the connecting line.

21. The electronic device of claim 13, further comprising a protective layer covering the overlapping part of the first conductive pad and the second signal line.

22. The electronic device of claim 13, wherein the protective layer includes a layer of indium tin oxide (ITO).

23. The electronic device of claim 13, further comprising a second conductive pad coupled with the second signal line and juxtaposed with the first conductive pad.

24. The electronic device of claim 23, further comprising a third signal line juxtaposed with the second signal line, the third signal line and the first signal line being disposed at two sides of the second signal line respectively, wherein an insulation layer covers the third signal line, and the second conductive pad traverses two sides of the third signal line, and the insulation layer isolates the third signal line from the second conductive pad.

25. The electronic device of claim 13, further comprising a third signal line juxtaposed with the second signal line, the third signal line and the first signal line being disposed at two sides of the second signal line respectively, wherein an insulation layer covers the third signal line, the first conductive pad traverses two sides of the third signal line, and the insulation layer isolates the third signal line from the first conductive pad.

26. The electronic device of claim 13, wherein the first conductive pad includes:
- a first portion coupled with the first signal line, the first portion and the first signal line being at the same side of the second signal line;
- a second portion electrically coupled with the first portion, between the second signal line and the third signal line; and
- a third portion electrically coupled with the second portion, the third portion and the second portion being at two sides of the third signal line, wherein the first conducting bump couples with the first portion, the second conducting bump couples with the second portion, and the third conducting bump couples with the third portion.

27. The circuit signal connection interface of claim 1, wherein the first conductive pad overlaps the second signal line, and the part of the first conductive pad overlapping the second signal line has a width equal to or smaller than a width of the first portion or the second portion of the first conductive pad.

28. The circuit signal connection interface of claim 5, wherein the connecting line overlaps the second signal line, and the connecting line has a width smaller than a width of the first portion or the second portion of the first conductive pad.

29. The electronic device of claim 13, wherein the first conductive pad overlaps the second signal line, and the part of the first conductive pad overlapping the second signal line has a width equal to or smaller than a width of the first portion or the second portion of the first conductive pad.

30. The electronic device of claim 19, wherein the connecting line overlaps the second signal line, and the connecting line has a width smaller than a width of the first portion or the second portion of the first conductive pad.

31. The electronic device of claim 13, wherein a conductive film layer is disposed between the circuit device and the circuit signal connection interface, and the first conducting bump and the second conducting bump are electrically connected to the first conductive pad through the conductive film layer.

* * * * *